July 4, 1933.  L. H. MIDDLETON  1,917,141
DEFROSTER
Filed Oct. 9, 1931
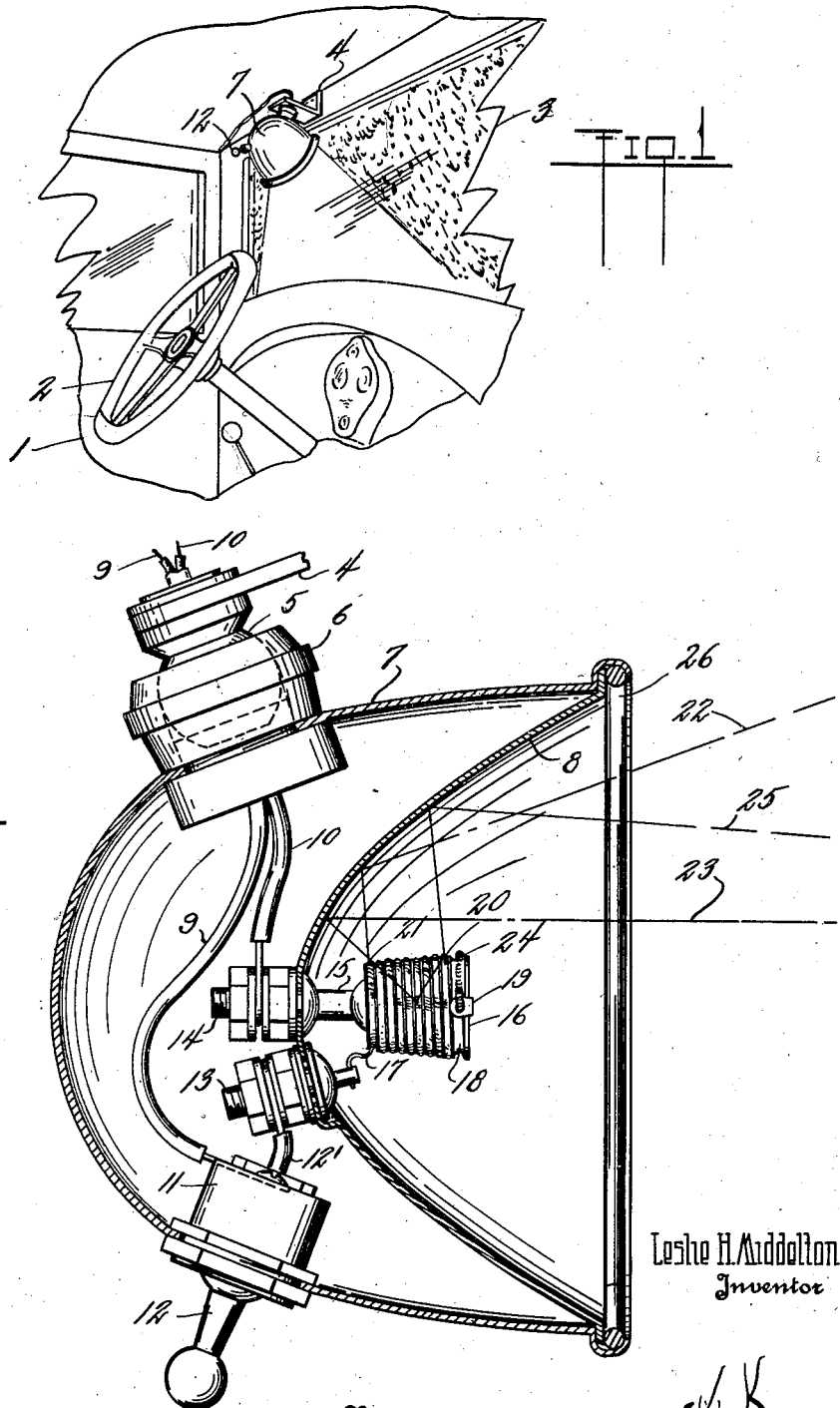

Patented July 4, 1933

1,917,141

UNITED STATES PATENT OFFICE

LESLIE H. MIDDLETON, OF ADRIAN, MICHIGAN, ASSIGNOR TO SCHWARZE ELECTRIC COMPANY, OF ADRIAN, MICHIGAN, A CORPORATION OF MICHIGAN

DEFROSTER

Application filed October 9, 1931. Serial No. 567,872.

This invention relates to clear vision promotion or removing accumulation from surfaces.

This invention has utility when incorporated in wind shields or outlook transparencies for elimination of interference, especially from accumulation of frost, snow, ice or moisture.

Referring to the drawing:

Fig. 1 is a perspective view of the interior of an automobile having an embodiment of the invention incorporated therewith; and Fig. 2 is a section through the unit of Fig. 1.

Motor vehicle 1 is shown provided with steering wheel 2 at the driver's station with outlook transparency or wind shield 3 for the operator or driver.

In the carrying out of the invention herein bracket 4 mounts ball 5 in fixed position. Adjustable socket 6 frictionally engages this ball 5 and mounts shell 7 as a housing for parabolic projector 8. Electric conductor lines 9, 10, extend through the bracket 4, ball 5, and socket 6 into the housing 7. This housing 7 has switch 11 operable by arm 12 for cutting in and out electric current from the line 9 to flow by line 12' to terminal 13. The line 10 extends to terminal 14 which mounts stem 15 carrying insulator 16 in the form of a cone having a spiral series of grooves. From the terminal 13, electric resistance conductor 17 as a resistance spiral extends in the spiral way 18 in the cone 16 to cut-over portion 19 connected through stem 15 for engagement with terminal 14 in completing the circuit.

The stem 15 fixes the location of this insulator 16 as to focus 20 for the parabola 8. This fixed location for the insulator so locates the spiral helix 17 of the electrical resistance as an energy source for rays toward the reflector from the focus 20 for dispersion. That is, rays from point 21 to the projector 8 disperse rather widely outwardly as rays 22. Rays from the focus 20 through point 21 will project approximately parallel as rays 23. Rays from forwardly of the focus 20, say from point 24 in their projection tend to converge as rays 25. The taper of this cone insulator 16 is such that in conjunction with the location in this projector, one looking in the projector from straight forward thereof, when the resistance is caused to glow, may see in the projector the rings of the resistance. This means that the ray dispersion is minimized. This ray dispersion is desirably below 10%. In practice, under the design herein, dispersion is 7½% for a spread beyond the dimension of ring 26 as the open end of this projector. This 7½% region for concentration has a degree of efficiency hereunder with the rays axially relatively more dense in the working region for the device, say 14" to 16" as the mean distance from the surface being cleared.

What is claimed and it is desired to secure by Letters Patent is:

1. A defroster for a constant voltage supply, said defroster embodying a parabolic reflector, a winding entirely inward from approximately half of the depth of the reflector, mounting means fixing the winding in said inner half depth and about the axis of the reflector for the winding to extend away from the reflector farther than the effective focus of the reflector, a shell about the reflector assembled with the open front end of the reflector, a universal mounting for the shell, electrical connections for the winding extending through the mounting and a switch carried by the shell for the connections with the winding.

2. A defroster unit embodying a shell having an open front provided with a seat thereabout, a parabolic reflector in said shell having its periphery in said seat, a split ring in said seat coacting with the reflector periphery to mount said reflector in the shell, said shell and reflector as assembled providing a chamber behind the reflector in said shell, a stem mounted axially by the reflector having one end thereof extending into the reflector region, an insulator about said stem end, an electric heating element carried by the insulator and extending about the stem and connected to the stem end, said shell being provided with an opening into said chamber, a threaded tubular member extending through said opening and having ledge means within the chamber to abut the inner side of the shell about the opening, there being socket means on the tubular member at the outer side of the shell coacting with the ledge means to clamp the shell therebetween, a ball carrying member assembled with said tubular member and socket means to provide a swivel mounting for the shell, and an electric connection through said tubular member and means into the chamber and connected to said heating element.

In witness whereof I affix my signature.

LESLIE H. MIDDLETON.